United States Patent
Annan et al.

(10) Patent No.: US 8,880,706 B1
(45) Date of Patent: Nov. 4, 2014

(54) METHOD AND SYSTEMS FOR ENABLING INTERACTION BETWEEN A DEVICE THAT COMPRISES A DISPLAY AND A SEPARABLE MOBILE CORE

(75) Inventors: Brandon C. Annan, Westwood Hills, KS (US); Lyle T. Bertz, Lee's Summit, MO (US); Robert H. Burcham, Overland Park, KS (US); Jason R. Delker, Olathe, KS (US); David A. Schmuck, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 777 days.

(21) Appl. No.: 13/149,487

(22) Filed: May 31, 2011

(51) Int. Cl.
*G06F 15/16* (2006.01)
*H04W 12/06* (2009.01)
*H04W 92/02* (2009.01)

(52) U.S. Cl.
CPC .............. *H04W 12/06* (2013.01); *H04W 92/02* (2013.01)
USPC ........... 709/227; 709/217; 709/218; 709/219; 709/228; 709/229

(58) Field of Classification Search
CPC ............................... H04L 12/06; H04W 92/02
USPC .................. 709/217–219, 227–229
See application file for complete search history.

(56) References Cited

U.S. PATENT DOCUMENTS

| | | | |
|---|---|---|---|
| 6,259,891 B1 * | 7/2001 | Allen | 455/3.02 |
| 6,957,060 B1 * | 10/2005 | Sharp | 455/410 |
| 7,346,025 B2 * | 3/2008 | Bryson | 370/328 |
| 8,521,956 B2 * | 8/2013 | Della Pia et al. | 711/115 |
| 2002/0141385 A1 * | 10/2002 | Wasik et al. | 370/352 |
| 2002/0187808 A1 * | 12/2002 | Vallstrom et al. | 455/558 |
| 2004/0005910 A1 | 1/2004 | Tom | |
| 2004/0267665 A1 | 12/2004 | Nam et al. | |
| 2005/0165766 A1 | 7/2005 | Szabo | |
| 2007/0173077 A1 * | 7/2007 | Wang | 439/1 |
| 2007/0235519 A1 | 10/2007 | Jang et al. | |
| 2008/0026730 A1 | 1/2008 | Appaji | |
| 2008/0108324 A1 | 5/2008 | Moshir et al. | |
| 2009/0006699 A1 | 1/2009 | Rofougaran | |
| 2009/0054091 A1 | 2/2009 | van Wijk et al. | |
| 2009/0069051 A1 * | 3/2009 | Jain et al. | 455/558 |
| 2010/0070375 A1 | 3/2010 | Lane et al. | |
| 2010/0119068 A1 | 5/2010 | Harris | |
| 2011/0066777 A1 * | 3/2011 | Della Pia et al. | 710/106 |
| 2012/0209950 A1 * | 8/2012 | Zhong et al. | 709/217 |
| 2013/0023203 A1 * | 1/2013 | Kakaire | 455/3.06 |
| 2014/0024342 A1 * | 1/2014 | Jain et al. | 455/411 |

OTHER PUBLICATIONS

Delker, Jason R., et al., Patent Application entitled "Executing Mobile User Applications", filed Aug. 17, 2009, U.S. Appl. No. 12/542,518.

(Continued)

*Primary Examiner* — Mohamed Wasel

(57) ABSTRACT

A system for enabling interaction with a user interface device, comprising a separable transportable mobile core comprising a radio transceiver, a processor, a memory, and a communication component, wherein the mobile core receives indicia of the user interface device and communicates the indicia to a computer, wherein the computer authenticates the user interface device and transmits an instruction to the mobile core, and wherein the instruction enables the mobile core to interact with the user interface device.

20 Claims, 5 Drawing Sheets

(56) References Cited

OTHER PUBLICATIONS

Pre-Interview Communication dated Sep. 28, 2011, U.S. Appl. No. 12/542,518, filed Aug. 17, 2009.
FAIPP Office Action dated Nov. 8, 2011, U.S. Appl. No. 12/542,518, filed Aug. 17, 2009.
Final Office Action dated Jan. 26, 2012, U.S. Appl. No. 12/542,518, filed Aug. 17, 2009.
Advisory Action dated Apr. 10, 2012 U.S. Appl. No. 12/542,518, filed Aug. 17, 2009.
Office Action date Sep. 5, 2012, U.S. Appl. No. 12/542,518, filed Aug. 17, 2009.
Final Office Action dated Dec. 26, 2012, U.S. Appl. No. 12/542,518, filed Aug. 17, 2009.
Office Action dated Sep. 4, 2013, U.S. Appl. No. 12/542,518, filed Aug. 17, 2009.
Advisory Action dated Jan. 14, 2014, U.S. Appl. No. 12/542,518, filed Aug. 17, 2009.
Examiner's Answer dated Mar. 21, 2014, U.S. Appl. No. 12/542,518, filed Aug. 17, 2009.

\* cited by examiner

METHOD AND SYSTEMS FOR ENABLING INTERACTION BETWEEN A DEVICE THAT COMPRISES A DISPLAY AND A SEPARABLE MOBILE CORE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones generally comprise a display, a keyboard, a microphone, a speaker, a memory, a processor, and a transceiver. Some of these components provide user interface device functionality, such as the display, the keyboard, the microphone, and the speaker. Other components may provide the operability of the device, such as the memory, the processor, and the transceiver. Some mobile phones may contain distinct user interface device features, but similar or identical functionality and/or components.

SUMMARY

In an embodiment, a system for enabling interaction with a user interface device is disclosed. The system comprises a separable transportable mobile core comprising an operating system, a memory, a radio transceiver, a processor, and a communication component; a user interface device comprising indicia of a service provider, wherein the mobile core receives the indicia and communicates the indicia to the service provider, wherein the service provider authenticates the user interface device and transmits an instruction to the mobile core, and wherein the instruction enables the mobile core to interact with the user interface device.

In an embodiment, a system for enabling interaction with a user interface device is disclosed. The system comprises a separable transportable mobile core comprising an operating system, a memory, a radio transceiver, a processor, and a communication component; a user interface device comprising indicia of a service provider, wherein the mobile core receives the indicia and communicates the indicia to the service provider, wherein the service provider authenticates the user interface device and transmits an instruction to the mobile core, and wherein the instruction enables the mobile core to interact with the user interface device.

In an embodiment, a system for enabling interaction with a user interface device is disclosed. The system comprises a separable transportable mobile core comprising a radio transceiver, a processor, a memory, and a communication component, wherein the mobile core receives indicia of the user interface device and communicates the indicia to a computer, wherein the computer authenticates the user interface device and transmits an instruction to the mobile core, and wherein the instruction enables the mobile core to interact with the user interface device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
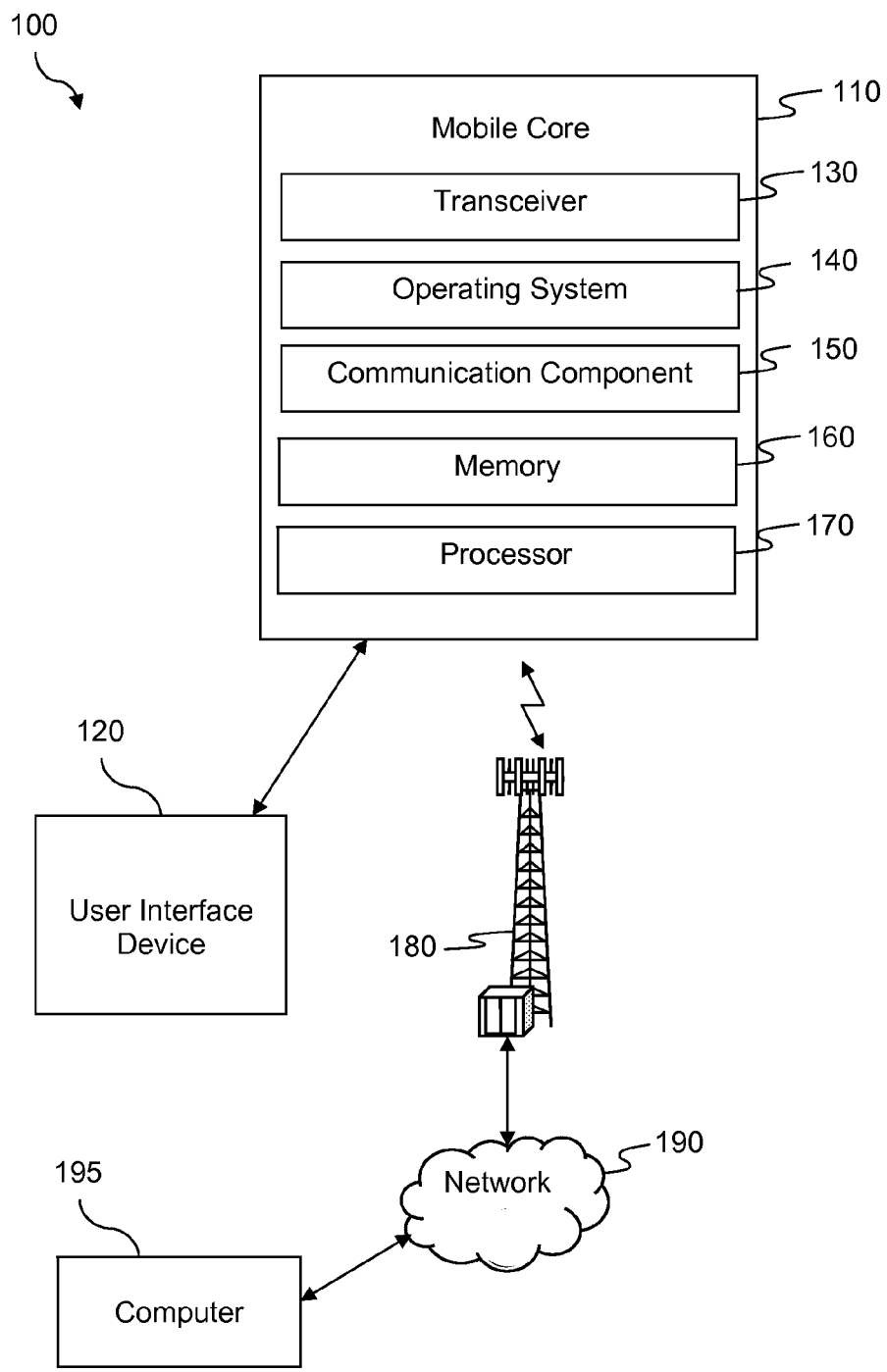
FIG. 1 illustrates a mobile communication system, representative of an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method are taught that enable a mobile core to be configured to interact with a variety of user interface devices. A mobile core may be a plug-in component that provides some of the functionality of a device such as a mobile phone. The mobile core may provide a transceiver, a processor, a communication component, a memory, and/or other components and/or functionalities. When a mobile core is transferred from one user interface device to another, the mobile core may determine what components are provided by the new user interface device, and how to interact with these components.

As used here, the term "user interface device" describes a device that contains limited or no functionality until combined with a mobile core. In general, the term user interface device applies to a device by which humans may interact with equipment or machines such as computers, mobile phones, and such. A user interface device may include physical and logical components. In some situations, a user interface device may be limited to a display, a keyboard, and a software application, In the present application the term applies more broadly to the hardware, firmware, software, and the like that provide the user experience associated with a device. For example, with a mobile phone, the handset itself could be described as the user interface device, while the internal components such as a radio transceiver, a memory, a processor, and such might not be considered as part of the user interface device, but may nonetheless be required in order for the mobile phone to function. Generally, the user interface device comprises hardware and/or software intended to provide interaction with a user of the user interface device, such as input and output. Individual components of the user interface device that provide this interaction may include a keyboard, a display, a microphone, and an earpiece. Also, typically the user interface device provides the user experience—that is to say that, from a user's perspective, the user interface device is the embodiment of a fully functional device, and the internal components, though providing a large portion of the functionality of the combined device, are virtually invisible to the user.

The term "mobile core" will be used herein to describe a unit that is separate from the user interface device, but is also limited in functionality on its own. The mobile core may provide componentry and/or functionality to a user interface device when combined therewith. Utilizing the mobile phone example above, the internal components of the mobile phone would be considered as the mobile core. When the user interface device and the mobile core portions are combined, they work together as a combined unit with greater functionality than either of the individual components can provide, alone. In this example, the mobile core and the user interface device could be combined to form a functional mobile phone. While not wishing to be limited, it may be appropriate to describe these two units in terms of the mobile core acting as something of a "brain" for the combined unit, and the user interface device as acting as the "body" of the combined unit. In the disclosure, the mobile core is removable from one user interface device and transportable to another user interface device.

In an embodiment, the mobile core may be connected to a user interface device. If the mobile core has not previously been connected to the user interface device, the mobile core may not be configured to interact therewith. The mobile core may receive indicia from the user interface device, which may include one or more type and quantity of information such as the identity of the user interface device, a shared secret or other security token, a date of purchase, and/or other pieces of information, some of which may be encrypted. The mobile core may then, via its transceiver, communicate with another entity, such as a service provider, and may transmit all or a portion of the indicia of the user interface device. The service provider may decrypt and/or evaluate the indicia to authenticate the user interface device, and respond to the mobile core with an instruction that enables the mobile core to interact with the user interface device. The instruction (e.g. a driver) may enable the mobile core to access and utilize aspects and/or components of the user interface device such as displays, input/outputs, the antenna, the speaker and/or microphone, the keyboard, logic components, and other such portions of the user interface device as may be appropriate for utilization by the mobile core, when working symbiotically with the user interface device. In addition, the battery of the user interface device may be the source of power for the mobile core, which may not have its own power supply.

In an embodiment, user interface devices and mobile cores may be manufactured and/or provided by the same or different manufacturers and/or providers. For example, a mobile phone manufacturer may supply the user interface device, and a mobile service provider may supply the mobile core. Mobile cores may be packaged, sold, and/or shipped separately from user interface devices, and the mobile core may be installed into the user interface device at any point thereafter, such as by an end user or an agent of a service provider. Installation may be as simple as, for example, installing a memory card such as compact flash (CF) card or a secure digital (SD) card into a camera or other device.

In an embodiment, mobile cores may be provided with appropriate software, firmware, and/or programming to provide them with the ability to interface with a particular user interface device. Alternatively, but as part of the present disclosure, mobile cores may be programmed, reprogrammed, and/or reconfigured suitably, in order to permit their use in other user interface devices, as may be appropriate for a given application of the mobile core. This operation may be done locally, for example at a retail store of a mobile service provider, or remotely via wireless communication by a user of the user interface device. This remote reconfiguration may even be undertaken while a mobile core is installed in a user interface device.

Turning now to FIG. 1, a system 100 is described. The system 100 comprises a mobile core 110, a user interface device 120, a base transceiver station (BTS) 180, a network 190, and a computer 195. The mobile core 110 is separable from the user interface device 120. The mobile core 110 further comprises a transceiver 130, an operating system 140, a communication component 150, a memory 160, and a processor 170. The mobile core 110 may be a module or card that is insertable into a user interface device 120, connectable to a user interface device 120, or otherwise configured to interact with the user interface device 120 (e.g. a card that slides into a slot in a mobile handset). The mobile core 110 may provide one or more functionality that is not provided by the user interface device. For example, the transceiver 130 of the mobile core 110 may be a radio frequency (RF) transceiver, a software-defined radio transceiver (SDR), a BLUETOOTH transceiver, a Wi-Fi transceiver, a WLAN transceiver, a modem, a Medium Attachment Unit (MAU), an Ethernet transceiver such as gigabit interface converter (GBIC), small form-factor pluggable (SFP), XFP (10 Gigabit Small Form Factor Pluggable), and XGMII (10 Gigabit Media Independent Interface), or other type of transmitting/receiving unit, and may provide the ability to communicate with other entities, such as external communications entities. In an embodiment, mobile core 110 may include more than one transceiver 130. The transceiver 130 may communicate via public networks, private networks, or combinations thereof. In addition, the mobile core 110 may comprise identification and/or authentication information or data that may permit a service provider to authenticate the mobile core 110 (e.g. to verify that the mobile core 110 is a valid mobile core 110 of the service provider).

The operating system 140 of the mobile core 110 may be software, firmware, or such that substantially acts as an intermediary between higher level operations such as user input and lower level operations such as interacting with other hardware, software, processors, or other parts or functionalities of a device or devices. As an example, an operating system may provide functions such as task scheduling, memory management, communications between processes, and the like. In an embodiment, the mobile core may not include an operating system. In another embodiment, the user interface device may comprise an operating system. In yet another embodiment, both the mobile core and the user interface device may include operating systems. In still another embodiment, neither the mobile core nor the user interface device may comprise an operating system.

The communication component 150 may be a connection that couples to the device (e.g. user interface device 120) with which the mobile core 110 is to interact. For example, the communication component 150 may be a port connector, an edge-card connector, a multi-pin connector, or other form of connecting apparatus and may further comprise software, firmware, or other form of communications protocol for communicating between the mobile core 110 and the user interface device 120.

The user interface device 120 may further comprise a power supply (e.g. a battery). In an embodiment, the battery may provide power for one or more of the user interface device 120 and the mobile core 110.

The BTS 180 may provide for transmitting and receiving radio signals via equipment such as antennas, transceivers, and/or equipment for encrypting and/or decrypting communications between entities and/or locations. For example, the BTS 180 may receive signals from and transmit signals to the transceiver 130 of the mobile core 110. The BTS 180 may have several transceivers which allow it to serve multiple frequencies and different sectors of a communications cell. The BTS 180 is generally controlled by a parent via a base station control function, which is implemented as a discrete unit or incorporated into a transceiver. The functions of the BTS 180 may vary, depending on the cellular technology used and the cellular telephone provider, but the main function, that of receiving/retransmitting signals, as in mobile phone calls and/or messages, is generally the same across various forms of the BTS 180. The BTS 180 and similar systems are generally equipped with radios that are able to modulate frequencies for Global System for Mobile communication signals such as GSM, GSM 2G+, GSMK, 8-PSK, and the like, as appropriate for a given situation.

In additional embodiments, some of the components of mobile core 110 may alternatively be located on or in the user interface device 120, as may be suitable in a given application. For example, memory 160, which is shown as being located on mobile core 110 may be more appropriately located on user interface device 120. Other components may similarly be relocated from mobile core 110 to user interface device 120, or vice versa, as may be appropriate in some instances or may suit certain design preferences.

The network 190 may comprise a plurality of devices such as routers, servers, computers, and/or other devices. One skilled in the art may realize that the plurality of devices of the network 190 may be interconnected, either physically or via wireless communication (not shown) to provide paths for communications to travel from one location to another over the network 190. The connections may be dynamic and the associated paths from one point to another may change from time-to-time. Path changes may be the result of individual devices becoming overloaded, disabled, or otherwise unavailable to transmit data packets via the network 190. While the plurality of devices of may comprise the network 190, it is understood that numerous connectivity paths through the devices of the network 190 are within the spirit of the present disclosure. When a device becomes unavailable, the data packets may be rerouted through an alternate path to the destination.

The computer 195 may be a server computer or such, and may be configured and/or arranged to connect wirelessly or directly to the network 190. The computer 195 may be, for example, a computer of a service provider and may receive information from and transmit information to the mobile core 110 via network 190 and BTS 180 or similar pathway.

Figure 2:
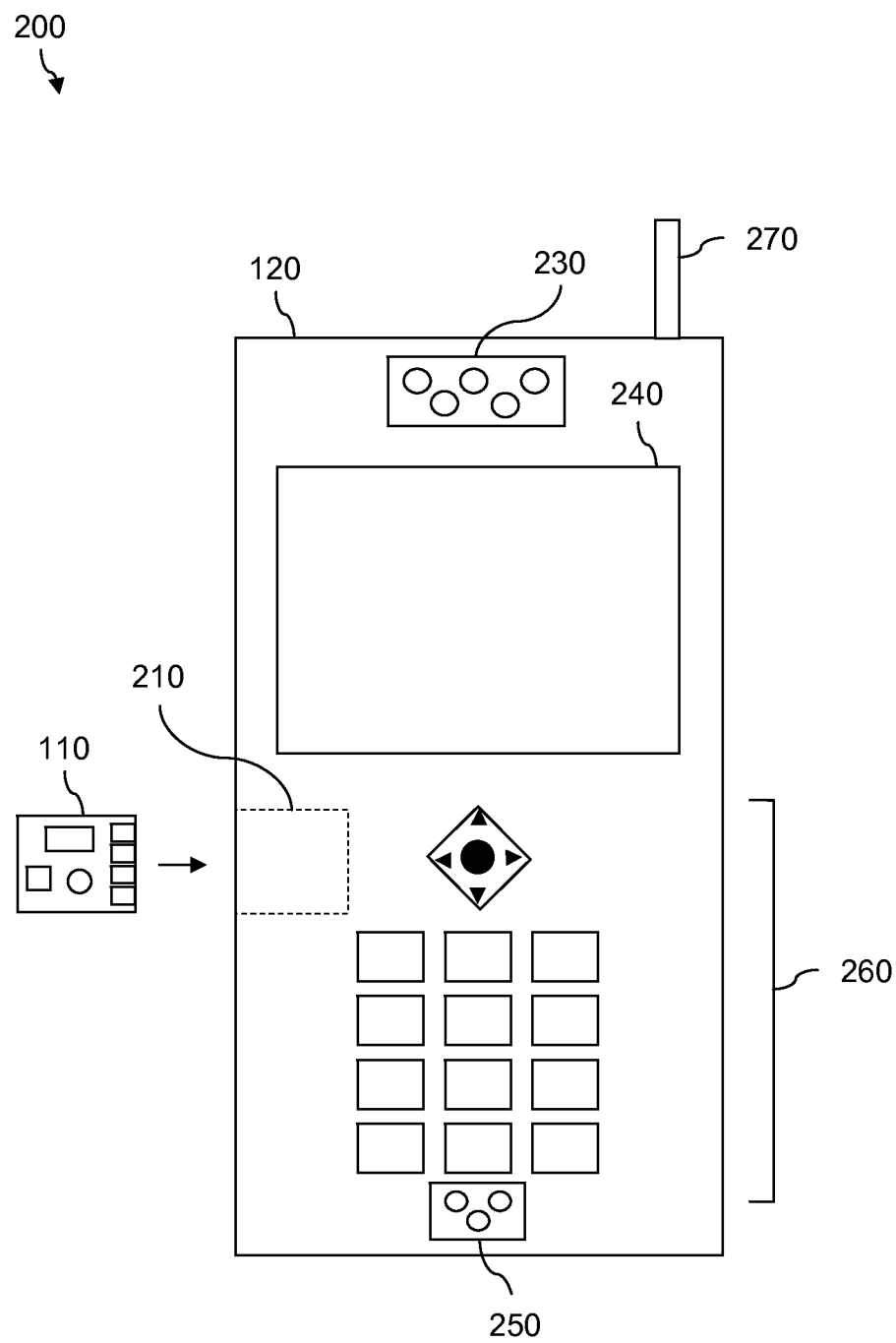
FIG. 2 illustrates a mobile device, representative of an embodiment of the disclosure.

Turning now to FIG. 2, a mobile device 200 is described. Mobile device 200 comprises a mobile core 110, and a user interface device 120. The user interface device 120 further comprises a slot 210, an earphone 230, a display 240, a microphone 250, a keyboard 260, and an antenna 270. The keyboard 260 may further comprise alphanumeric keys, a Touchscreen, a cursor movement button and/or other buttons that may be located anywhere on the mobile device 200—all of which generally allow a user to interact with the user interface device 120.

In an embodiment, the user interface device 120 may be a mobile phone, as depicted in FIG. 2. The user interface device 120 may not be provided with some of the components typically required to perform all of the functions of a mobile phone. In this embodiment, the mobile core 110 may comprise the components and functionality that the user interface device 120 lacks, such as the transceiver 130, the operating system 140, and the communication component 150. However, when the mobile core 110 is connected to the user interface device 120, they combine to form a fully functional mobile phone. In combination, the mobile core 110 and the user interface device 120 may perform the typical functions of a mobile phone, such as receiving phone calls. By way of example, but not wishing to be limited, receiving phone calls may proceed as follows. An incoming radio frequency signal from BTS 180 may be received by the antenna 270 of the user interface device 120. The radio frequency signal may then be passed, via the communication component 150, to the mobile core 110. The transceiver 130 of the mobile core 110 may then down-convert and demodulate the content of the radio frequency signal. The communication component 150 may then send the content back to the user interface device 120, which may then present the content as, for example, a voice signal played over the earphoner 230.

The voice of the user of the mobile phone may be conveyed as follow. The voice of the user may be received by the microphone 250 of the user interface device 120. The voice signal may then be sent by the user interface device 120, via the communication component 150 of the mobile core 110, to the transceiver 130. The transceiver 130 may then modulate and up-convert the voice signal and pass it to the antenna 270 for radiation to the BTS 180.

In an embodiment, the mobile core 110 may be transportable between a variety of different user interface devices 120. In an embodiment, the mobile core 110 is separable from the user interface device 120 and transferable to one or more alternative user interface devices 120. For example, the mobile core may be transportable to a user interface device 120 such as an automobile. Many modern automobiles come equipped with built-in mobile phone componentry such as BLUETOOTH transceivers, microphones, hands-free call placing capabilities, and the like. The equipment of the automobile may be configured to interact with the mobile phone of the driver or owner of the automobile to permit, for example, hands-free phone calls while in the automobile. In an embodiment, a user of the mobile core 110 may remove the mobile core 110 from a user interface device 120 such as a mobile phone and install it into a slot in the dashboard of an automobile. The coupling of the mobile core 110 with the componentry of the automobile may provide a user with the ability to utilize the componentry of the automobile in a manner very similar to their mobile phone when it is coupled with the mobile core 110. This may provide an enhanced user experience by more closely resembling the user experience of the user's mobile phone, and may simplify the transition from one platform to the other by the user.

In another embodiment, a user may have several user interface devices 120 such as mobile handsets and may prefer one over the others for a given situation or application. For example, a user may have a user interface device 120 that is a weather-proof mobile handset for use when participating in outdoor activities such as skiing, hunting, fishing, boating, or the like. In this example, the user may remove the mobile core 110 from the mobile handset that they use for daily situations and may place it into the weather-proof unit when heading to the lake for a day of outdoor activities.

As another example, when a user is going out for a formal night on the town, he/she may have a mobile handset that is small and fits nicely in the coat pocket of a tuxedo or in a small clutch handbag. Again, the user may remove the mobile core 110 from their daily-use mobile handset and may place it into the formal mobile handset to use it as a mobile phone for their evening event. This may again provide the user with a seamless transfer of capabilities and/or functionality between a variety of mobile handsets.

In other embodiments, the forms, features, and functions of the user interface device 120 may be the same, similar, or different, as may also be those of the mobile core 110. In all or most of the embodiments, however, the combined utility of the mobile core 110 in conjunction with the user interface device 120 provides is substantially enhanced over either of these two units, separately.

Figure 3:
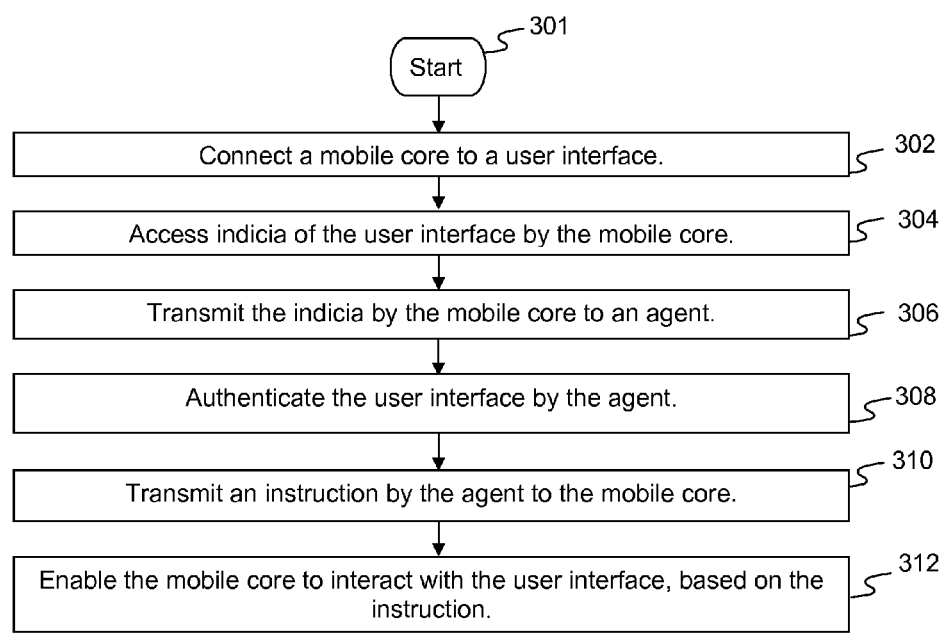
FIG. 3 is a flowchart of an embodiment of the disclosure.

Now turning to FIG. 3, a method 300 is described. In step 301, the method starts. In step 302, the mobile core 110 is connected to the user interface device 120. In an embodiment, the mobile core 110 may be connected via any form of connector, plug, cable, wiring, edge-card connection, slot, pins, or other type of connecting method or apparatus that provides interconnection, communication, and/or coupling of the mobile core 110 and the user interface device 120. For example, the mobile core 110 may be inserted into a slot of the user interface device 120, in a manner similar to a compact flash card that is inserted into a digital camera or a secure data card that is inserted into a memory slot on any one of various devices. Upon suitable insertion or other form of coupling, contact and/or other type of connection is established between the mobile core 110 and the user interface device 120, which may permit communication between the mobile core 110 and the user interface device 120, via the communication component 150.

In step 304, the mobile core 110 accesses indicia of the user interface device 120. In an embodiment, the mobile core 110 and the user interface device 120 may be provided by separate business entities. For example, the mobile core 110 may be provided by a mobile phone service provider, and the user interface device 120 may be provided by a mobile phone manufacturer. Whether the mobile core 110 and the user interface device 120 are from the same manufacturer and/or provider or not, it may be necessary for the mobile core 110 to determine the identity and configuration of the user interface device 120. In this example, the mobile core 110 may query the user interface device 120, to determine any of numerous parameters that indicate the configuration of the user interface device 120. In response to the query, the user interface device 120 may provide to the mobile core 110, via the communication component 150, indicia indicating relevant information and/or data regarding the user interface device 120 to the mobile core 110. The indicia may be of any form or format suitable to permit the mobile core 110 to suitably receive the indicia. In an embodiment, a portion of the indicia may be encrypted.

In step 306, the mobile core 110, via the transceiver 130, transmits the indicia to a third party, such as computer 195 of a mobile service provider, a mobile phone manufacturer, a clearinghouse, or other entity. The computer 195 may then decrypt the indicia, if needed, and may also further interpret the indicia. The computer 195 may compare information of the indicia to, for instance, records in a database.

In step 308, the computer 195 authenticates the information of the indicia in order to identify the user interface device 120. When the computer 195 determines that the indicia provides sufficient indication of authenticity and/or identification of the user interface device 120, it may determine relevant information such as configuration and/or setup information of the user interface device 120. The computer 195 may then locate, as in a database, an instruction such as a configuration protocol or a device driver, and communicate the instruction to the mobile core 110.

In step 310, the instruction is communicated from the computer 195 to the mobile core 110 in an encrypted form. The communication from the computer 195 to the mobile core 110 may be over the network 190 via the BTS 180. The mobile core 110 may receive the instruction and may decrypt it, as needed.

At step 312, the mobile core 110 is enabled to interact with the user interface device 120, based on the instruction. For example, the user interface device 120 may comprise a high resolution screen that can display special graphical information. The mobile core 110 may receive information in the instruction that indicates the dimensions of the display, the resolution of the display, the pixel ratio of the display, the aspect ratio of the display, and/or other information that may permit the mobile core 110 to appropriately display information on the display of the user interface device 120. In addition, the instruction may be stored in the memory 160 of the mobile core 110.

In an embodiment, the mobile core 110 may be transportable, in that it may be removed from one device, for example a mobile phone, and may be connected to another mobile phone. This transportability may provide benefits to the owner/user of the mobile core 110. For example, the user of the mobile core 110 may decide to upgrade to another mobile phone with features not provided by his/her current mobile phone. In conventional circumstances, the user may be reluctant to upgrade, as there may be a financial penalty for doing so. For example, if the service provider of the mobile phone requires a contractual period of ownership, there may be a charge for switching phones prior to the termination of the contract. However, with the system and methods of the present disclosure, the mobile core 110 may be the unit under contract with a service provider, therefore the contract may be written such that transporting the mobile core 110 to another user interface device 120 may constitute continued service, and the user of the mobile core 110 may be permitted to remove the mobile core 110 from one user interface device 120 and transport it to another, without penalty or with reduced negative repercussions.

In another embodiment of the disclosure, the mobile core 110 may comprise components that constitute a major portion of the expense of a traditional mobile phone. In this example, removing these components and transporting them to another mobile device may be cost-effective, in that the receiving mobile device may be produced without the components of the mobile core 110, and may therefore cost less to produce. This may lead to a cost savings to the producer of the mobile device, which may then be realized as a cost savings by the purchase of said mobile device.

In yet another embodiment, transporting the mobile core 110 from one unit to another may provide a convenience factor for the user of the mobile core 110, in that the mobile core 110 may store in its memory 160 information and/or data belonging to the user of the mobile core 110. In this case, when the user transports the mobile core 110 from one unit to another, a portion of the user's information may be transported along therewith, and may reduce the inconvenience of having to program said information back into the receiving unit manually by the user.

In another embodiment, the present disclosure may offer economic advantages to a provider of mobile cores 110, user interface devices 120, mobile handsets (e.g. mobile phones), service providers, or others practicing the teachings herein. For example, some parties involved in the manufacture and/or implementation of mobile handsets may be required to pay licensing fees, royalties, and/or other remuneration to holders of intellectual property rights (e.g. patents) relating to the technologies incorporated into said devices. For example, a mobile phone may employ an operating system for which the intellectual property rights are owned by a third party. In this case, the mobile phone manufacturer and/or service provider may be required to pay a licensing fee to the intellectual property rights owner for the right to use the patented operating system. With the present disclosure, it may be advantageous for a mobile phone manufacturer/service provider to place the operating system on the mobile core 110, and then license the technology for the mobile core 110. Then, as the mobile core 110 is transferred from one user interface device 120 to another, additional licensing costs would not be incurred, as the licensed technology would transfer seamlessly between user interface devices 120. The license would pertain solely to the mobile core 110, not to the user interface device 120. In the situation where a mobile phone does not have a separable transportable mobile core 110, each mobile phone would have to be licensed to use the operating system, individually or by a blanket license that covers the number of phones utilizing the operating system.

In addition, it may even be possible for the mobile phone end user to realize part of the financial benefit if the manufacturer/service provider passes some of their savings along to the mobile phone user. Also, reduced licensing costs may provide a competitive advantage to the manufacturer/service provider over their competition, as their ability to reduce licensing fees may make them more competitive.

In still another embodiment, the indicia of the user interface device 120 may comprise a variety of information. For example, the indicia may include a shared secret or other security token for identifying the user interface device 120. A shared secret may be data or a set of data that is known only to the parties involved in a secure communication. The shared secret or other security token may be a password, a passphrase, a big number, an array of randomly chosen bytes, or other form of secure identity protocol, and may be provided in order to help ensure the identity and authenticity of the user interface device 120. For example, a user may attempt to deceive a service provider or such by trying to use a counterfeit device, such as a pirated mobile phone or such.

Figure 4:
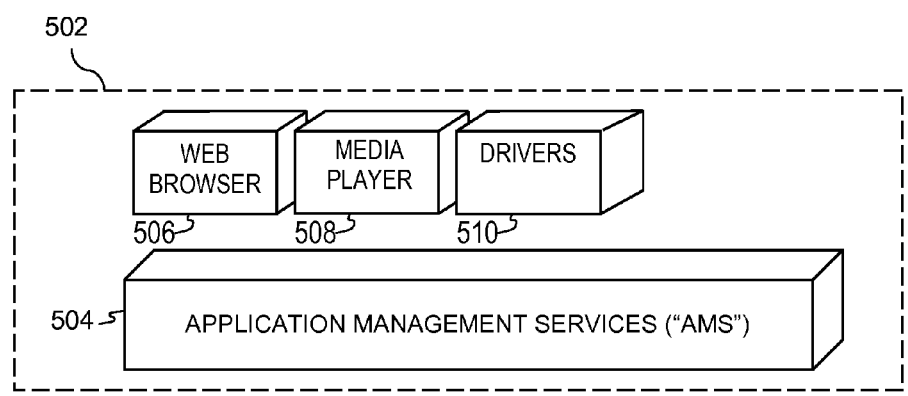
FIG. 4 is a block diagram of a software environment of a mobile core, representative of an embodiment of the disclosure.

FIG. 4 illustrates a software environment 502 that may be implemented by the processor 170. The processor 170 executes the operating system 140 that provides a platform from which the rest of the software operates. The operating system 140 provides drivers for the mobile core hardware with standardized interfaces that are accessible to application software. The operating system 140 includes application management services ("AMS") 504 that transfer control between applications running on the mobile core 110. Also shown in FIG. 4 are a web browser application 506, a media player application 508, and the drivers 510. The web browser application 506 configures the mobile core 110 to enable the operation of a web browser, allowing a user of the user interface device 120 to enter information into forms and select links to retrieve and view web pages. The media player application 508 enables the user interface device 120 to retrieve and play audio or audiovisual media. The drivers 510 enable the user interface device 120 to provide games, utilities, and other functionality.

Figure 5:
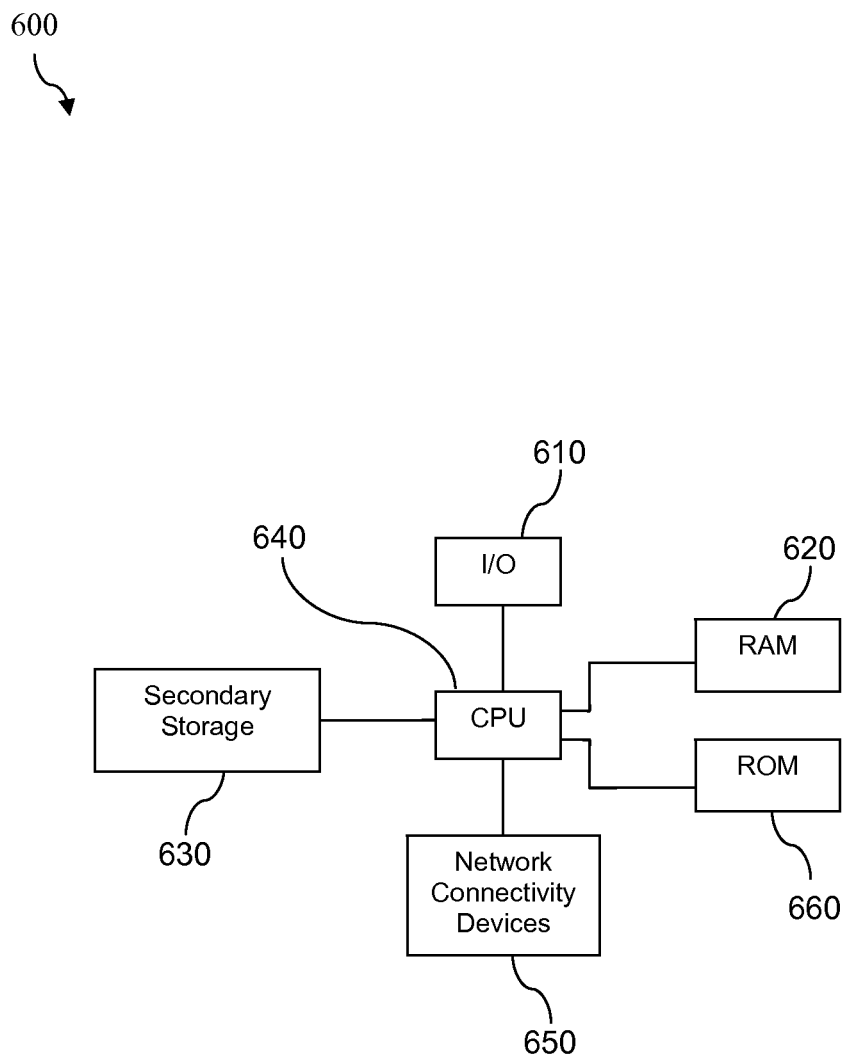
FIG. 5 illustrates a computer system suitable for implementing the several embodiments of the disclosure.

FIG. 5 FIG. illustrates a computer system 600 suitable for implementing one or more embodiments disclosed herein. The computer system 600 includes a processor 640 (which may be referred to as a central processor unit or CPU) that is in communication with memory devices including secondary storage 630, read only memory (ROM) 660, random access memory (RAM) 620, input/output (I/O) devices 610, and network connectivity devices 650. The processor 640 may be implemented as one or more CPU chips.

It is understood that by programming and/or loading executable instructions onto the computer system 600, at least one of the CPU 640, the RAM 620, and the ROM 660 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 630 is typically comprised of one or more disk drives or tape drives and is used for non-volatile storage of data and as an over-flow data storage device if RAM 620 is not large enough to hold all working data. Secondary storage 630 may be used to store programs which are loaded into RAM 620 when such programs are selected for execution. The ROM 660 is used to store instructions and perhaps data which are read during program execution. ROM 660 is a non-volatile memory device which typically has a small memory capacity relative to the larger memory capacity of secondary storage 630. The RAM 620 is used to store volatile data and perhaps to store instructions. Access to both ROM 660 and RAM 620 is typically faster than to secondary storage 630. The secondary storage 630, the RAM 620, and/or the ROM 660 may be referred to in some contexts as computer readable storage media and/or non-transitory computer readable media.

I/O devices 610 may include printers, video monitors, liquid crystal displays (LCD's), touch screen displays, keyboards, keypads, switches, dials, mice, track balls, voice recognizers, card readers, paper tape readers, or other well-known input devices.

The network connectivity devices 650 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 650 may enable the processor 640 to communicate with the Internet or one or more intranets. With such a network connection, it is contemplated that the processor 640 might receive information from the network, or might output information to the network in the course of performing the above-described method steps. Such information, which is often represented as a sequence of instructions to be executed using processor 640, may be received from and outputted to the network, for example, in the form of a computer data signal embodied in a carrier wave.

Such information, which may include data or instructions to be executed using processor 640 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 640 executes instructions, codes, computer programs, scripts which it accesses from hard disk, floppy disk, optical disk (these various disk based systems may all be considered secondary storage 630), ROM 660, RAM 620, or the network connectivity devices 650. While only one processor 640 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 630, for example, hard drives, floppy disks, optical disks, and/or other device, the ROM 660, and/or the RAM 620 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 630, to the ROM 660, to the RAM 620, and/or to other non-volatile memory and volatile memory of the computer system 600. The processor 640 may process the executable instructions and/or data structures in part by directly accessing the computer program product, for example by reading from a CD-ROM disk inserted into a disk drive peripheral of the computer system 600. Alternatively, the processor 640 may process the executable instructions and/or data structures by remotely accessing the computer program product, for example by downloading the executable instructions and/or data structures from a remote server through the network connectivity devices 650. The computer program product may comprise instructions that promote the loading and/or copying of data, data structures, files, and/or executable instructions to the secondary storage 630, to the ROM 660, to the RAM 620, and/or to other non-volatile memory and volatile memory of the computer system 600.

In some contexts, the secondary storage 630, the ROM 660, and the RAM 620 may be referred to as a non-transitory computer readable medium or a computer readable storage media. A dynamic RAM embodiment of the RAM 620, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 640 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, mobile cores, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for enabling interaction between a device that comprises a display and a separable mobile core of a communication device, comprising:

the separable mobile core configured for insertion into the device, the separable mobile core comprising a radio transceiver for communication with a network, a processor, a memory, and a communication component; and an authentication component in the network, wherein, upon insertion of the separable mobile core into the device, the separable mobile core receives indicia of the device, communicates the indicia to the authentication component via the network, and receives authentication and instructions from the authentication component via the network, and wherein the authentication and instructions comprise at least one of dimensions of the display of the device, pixel ratio of the display of the device, or aspect ratio of the display of the device and enable the separable mobile core to interact with the device.

2. The system of claim 1, wherein the indicia comprises identification of the device and a security token, and wherein a portion of the indicia is encrypted.

3. The system of claim 1, wherein the separable mobile core further comprises an operating system.

4. The system of claim 1, wherein the device is one of a wireless handset, a pager, a personal digital assistant (PDA), a gaming device, an inventory control device, a vehicle, a media player, and a portable computer.

5. The system of claim 1, wherein the separable mobile core is transportable between a plurality of devices.

6. The system of claim 1, wherein the device comprises a power supply.

7. The system of claim 6, wherein the separable mobile core receives power from the device.

8. A method for enabling interaction between a device that comprises a display and a separable mobile core of a communication device, comprising:

connecting the separable mobile core to the device, wherein the separable mobile core comprises an operating system, a memory, a radio transceiver for communication with a network, a processor, and a communication component;

in response to connecting the separable mobile core to the device, receiving, by the separable mobile core, indicia of the device;

transmitting, by the separable mobile core, the indicia to an authentication component via the network; and receiving, by the separable mobile core, authentication and instructions from the authentication component via the network, wherein the authentication and instructions comprise at least one of dimensions of the display of the device, pixel ratio of the display of the device, or aspect ratio of the display of the device and enable the separable mobile core to interact with the device.

9. The method of claim 8, wherein the device comprises a power supply.

10. The method of claim 9, further comprising the separable mobile core receiving power from the device.

11. The method of claim 8, wherein the indicia comprises identification of the device and a shared secret.

12. The method of claim 8, wherein a portion of the indicia is encrypted.

13. The method of claim 8, further comprising:
disconnecting the separable mobile core from a first device;
connecting the separable mobile core to a second device;
receiving indicia from the second device;
authenticating the second device;
receiving an instruction by the separable mobile core; and
configuring the separable mobile core to interact with the second device, based on the instruction.

14. The method of claim 8, wherein the device is one of a wireless handset, a pager, a personal digital assistant (PDA), a gaming device, an inventory control device, a media player, a vehicle, a portable computer, a tablet computer, and a laptop computer.

15. A system for enabling interaction between a device that comprises a display and a separable mobile core of a communication device, comprising:

the separable mobile core configured for insertion into the device, the separable mobile core comprising an operating system, a memory, a radio transceiver for communication with a network, a processor, and a communication component;

an authentication component in the network; and the device comprising indicia, wherein, upon insertion of the separable mobile core into the device, the separable mobile core receives the indicia, communicates the indicia to the authentication component via the network, and receives authentication and instructions from the authentication component via the network and wherein the authentication and instructions comprise at least one of dimensions of the display of the device, pixel ratio of the display of the device, or aspect ratio of the display of the device and enable the separable mobile core to interact with the device.

16. The system of claim 15, wherein the indicia comprises identification of the device and a shared secret.

17. The system of claim 15, wherein a portion of the indicia is encrypted.

18. The system of claim 15, wherein the device comprises a power supply, and the separable mobile core receives power from the device.

19. The system of claim 15, wherein the separable mobile core is transportable between a plurality of devices.

20. The system of claim 15, wherein the device is one of a wireless handset, a pager, a personal digital assistant (PDA), a gaming device, an inventory control device, a media player, a vehicle, a portable computer, a tablet computer, and a laptop computer.

* * * * *